H. Y. ARMSTRONG.
WRAPPING MACHINE.
APPLICATION FILED APR. 20, 1914.

1,244,277.

Patented Oct. 23, 1917.
6 SHEETS—SHEET 1.

Fig.1.

WITNESSES:
H. E. Hartwell.
Caroline N. Willis

INVENTOR.
Harry Y. Armstrong.
BY Chapin & Co.
ATTORNEY.

H. Y. ARMSTRONG.
WRAPPING MACHINE.
APPLICATION FILED APR. 20, 1914.

1,244,277.

Patented Oct. 23, 1917.
6 SHEETS—SHEET 6.

WITNESSES:
H. E. Hartwell.
Caroline W. Willis

INVENTOR.
Harry Y. Armstrong.
BY
Chapin & Co.
ATTORNEY.

UNITED STATES PATENT OFFICE.

HARRY Y. ARMSTRONG, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING-MACHINE.

1,244,277.        Specification of Letters Patent.       Patented Oct. 23, 1917.

Application filed April 20, 1914. Serial No. 833,157.

*To all whom it may concern:*

Be it known that I, HARRY Y. ARMSTRONG, a citizen of the United States of America, residing in the city of Springfield, county of Hampden, and State of Massachusetts, have invented certain new and useful Improvements in Wrapping-Machines, of which the following is a specification.

This invention relates to that general class of machines used to inclose articles in wrappers of various kinds and will be herein disclosed as embodied in a machine designed particularly for wrapping small sacks of tobacco, of the kind common on the market, and which are each provided with a draw string to close the opening in the sack.

The invention has for its general object to devise a thoroughly practical wrapping machine of the general type indicated; and it involves, among its features, a novel folding mechanism for wrapping a sheet of material about an article; an improved feeding mechanism for advancing the articles to be wrapped one at a time to the folding mechanism; a novel mechanism for positioning the wrapping material for the initial folding operation; an improved means for applying gum, or other adhesive material, to the wrapper, or article, to secure the wrapper thereon; and other features which will appear in the following detailed description of the preferred embodiment of the invention, and will be more particularly pointed out in the appended claims.

Referring to the drawings.

Figure 2:
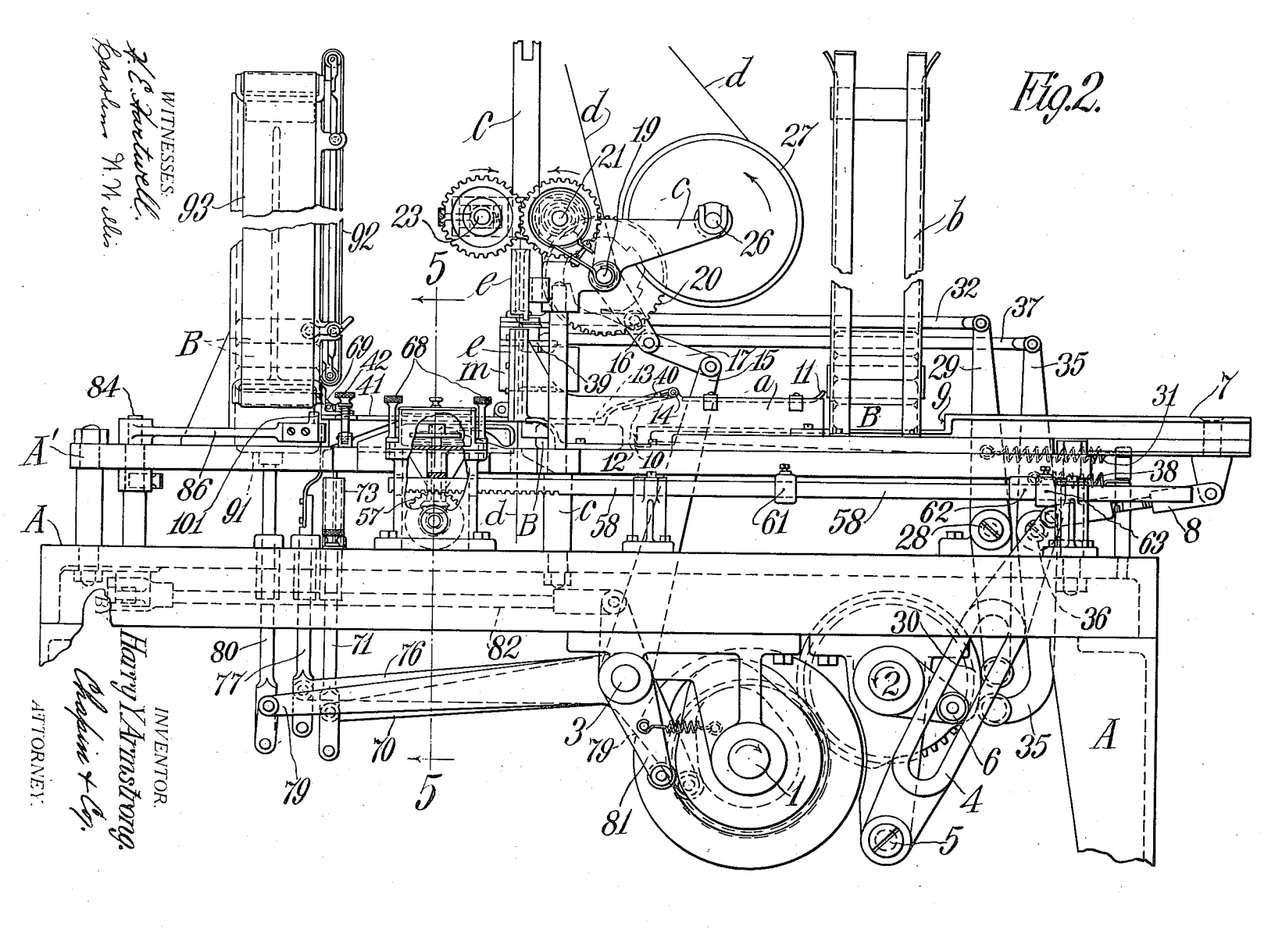
Fig. 2 is a side elevation of the assembled machine as it appears from the lower side of Fig. 1.
Figure 3:
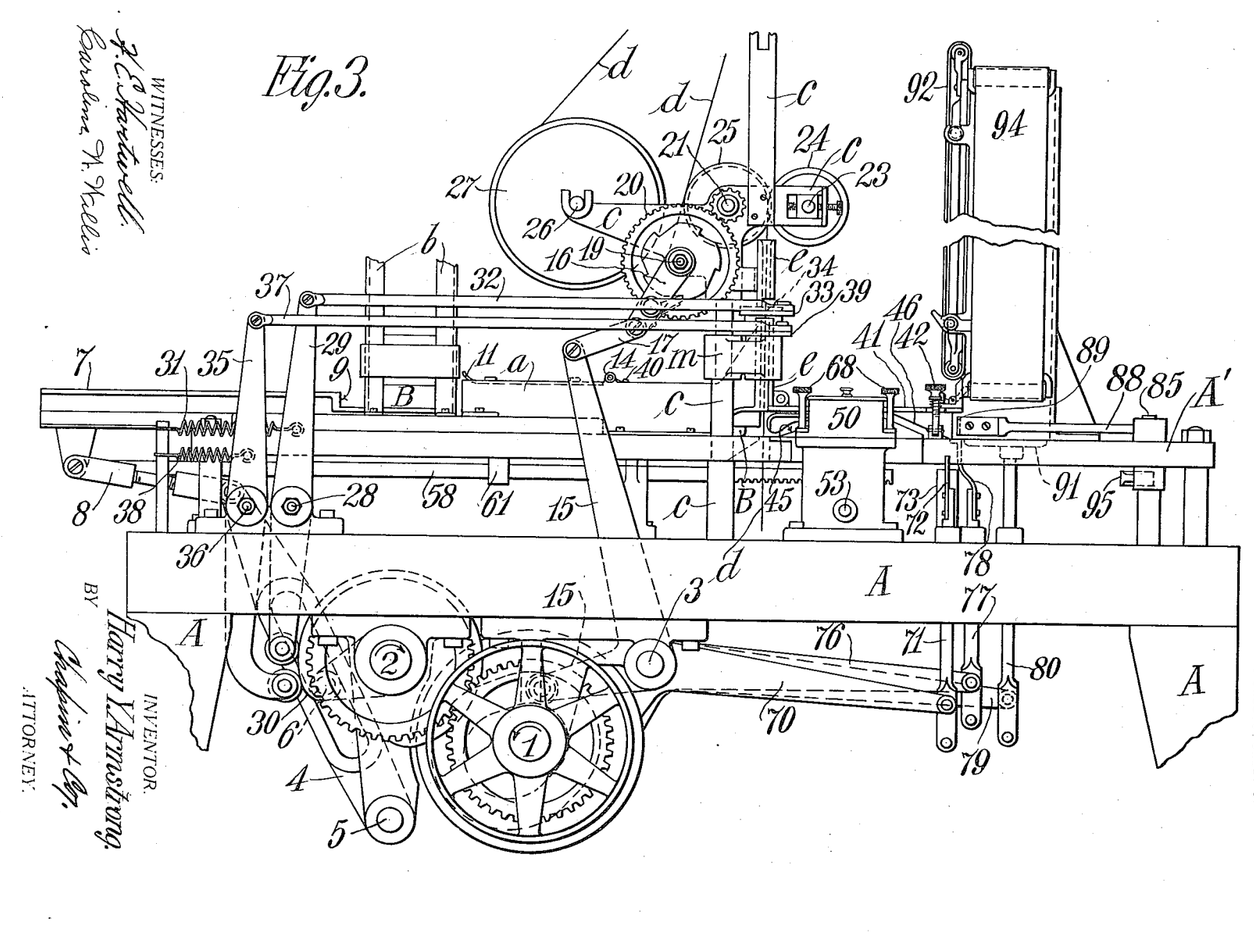
Fig. 3 is a side elevation of the machine as it appears from the upper side of Fig. 1.
Figure 4:
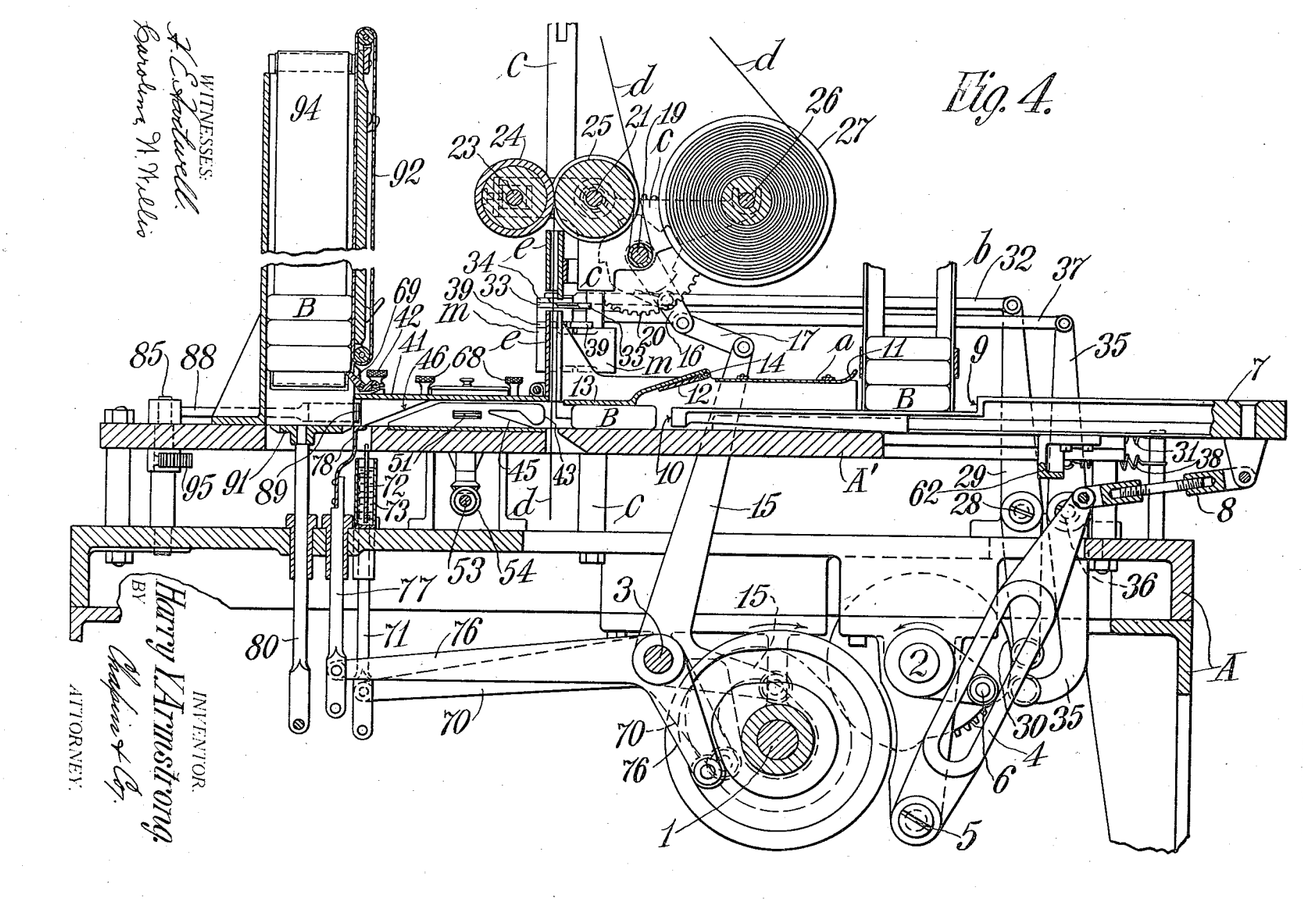
Fig. 4 is a sectional view taken on the line 4—4 of Fig. 1, looking in the direction of the arrow.
Figure 8:
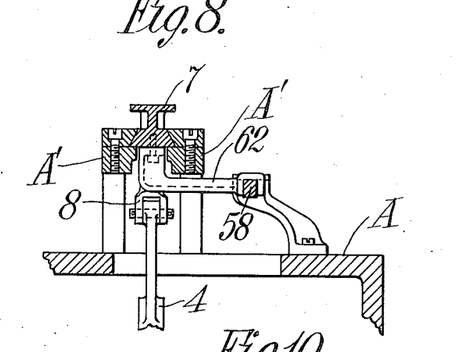
Fig. 8 is a sectional view taken through the guides for the plunger, showing the plunger in place in position to slide along the guides and showing also the connection between the plunger and the reciprocating rod for driving the gum applying rollers.

The improved means for feeding the packages to be wrapped through the machine will first be described. Referring to Figs. 2, 3, and 4: The main frame of the machine is indicated in general by A, and comprises in general supporting legs, brackets, etc. Mounted above the top of the table is a horizontal supporting means A' on which many of the parts are assembled. The plunger adapted to feed packages through the machine is mounted on the frame A' in suitable guides for horizontal movement back and forth as best shown in Fig. 8. This plunger 7 is arranged to have a part at all times extending below the feed magazine $b$ which is suitably mounted on the frame top A' to contain and guide the articles indicated by B. These articles are placed in the magazine with their draw string ends pointing forward, that is, in the direction in which they are to be advanced. This magazine is open at the bottom and the pile therein is supported on the plunger 7. The latter has two plunger faces 9 and 10 (see Fig. 4). When the plunger is in its rearmost position the faces 9 and 10 are in the position shown in Fig. 4 with a package B resting on the top face of the plunger. When the plunger is advanced the face 9 will force the lowermost article B through the chute $a$ against the pivoted plates 12 and 13. These plates are pivoted at 14. The plate 13 is shown in Fig. 4 in its lowermost position as is also plate 12. The latter is not permitted to fall below the position shown because of the ears 40 on the side thereof designed to engage the top edges of the feed chute $a$ as best shown in Figs. 2 and 3. As the article B is pushed against the plates 12 and 13 they swing upwardly and when the article is pushed beyond the forward edge of the plate 12 the latter will fall into the position indicated in Fig. 4 so that when the plunger is drawn back for the next operation the article is held in place because there is not room between the forward edge of the plate and the top of the plunger for the article to be pulled backwardly.

When the plunger is again in its rearmost position the weight of the plate 13 forces the article B into proper position on the top of the frame A' to be engaged by the plunger face 10 at the next movement of the plunger 7. The article B would of course fall into approximately this position without the assistance of the plate 13 but the weight of the latter bearing on top of the article B will insure the proper positioning of the article at all times. At the next forward movement of the plunger the article B first fed forward and which is now in front of the plunger face 10 will be forced against the wrapper strip through the folding box and into position on the plunger 91 at which point the wrapper will be entirely passed around the article B except at one end thereof. The draw string end on each article B strikes the wrapper first so that the loose or trailing ends of the strings are inclosed in the wrapper by the folding operations.

During this operation of the plunger another article B has been fed in the same manner as already described by means of the plunger face 9. The "stepped" construction of the plunger 7 and its operation as described has the following advantage: At each stroke of the plunger two articles are fed one in advance of the other and the articles are thus fed in pairs a given distance apart step by step rather than through the given distance in one step. This arangement and operation permits a saving in space and a more desirable design for the operating plunger. If the plunger were made to feed a single article its given distance by one stroke it would be necessary to make the distance traveled by the plunger approximately double the distance necessary under the arrangement shown herein. The fact that the reciprocations of the plunger in the machine shown are shorter than would be necessary in a plunger having a single face, saves floor space and increases the output of the machine.

The plunger is reciprocated from the power shaft 1 of the machine by the following mechanism: Shaft 2 (Fig. 4) is geared to the shaft 1 and on this shaft 2 there is a crank arm 6 having a roller at the end adapted to ride in the longitudinal slot of the lever arm 4. The latter is pivoted at its lower end at 5, to a suitable bracket of the main frame A and at its upper end is connected by means of a link 8, to a depending bracket on the end of the plunger 7. The rotation of the shaft 2, by means of the mechanism described will reciprocate the plunger 7 in the manner already described.

The paper feed mechanism will now be described. A supply of wrapping paper in a roll is mounted on a reel 27 which is supported by the shaft 26 in suitable brackets of the supplemental frame c as indicated in Fig. 4. The paper is unwound from the roll on the reel 27 and passes over a guide roll at the upper end of the supplemental frame c which guide roll is preferably pulled upwardly by springs (not shown), in order to put a tension on the strip of paper d. The paper, after passing over the guide roll, is fed downwardly around a loose roll on shaft 19 and between the two rolls 24 and 25. These rolls are mounted as shown, with one roll 24 having means to adjust it comprising the movable shaft 23 with sufficient pressure against the other roll 25 for feeding the paper strip d. The roll 25 is adapted to be driven in order to feed the paper downwardly through the paper guides e. The longitudinal openings through these guides, as shown in Fig. 4, permit the cutting mechanism and the clamping mechanism to operate against the strip in the guides.

The roll 25 is driven as follows: A bell-crank-lever 15, loosely pivoted on the rod 3 has its lower end provided with a roller engaging in a cam groove indicated in dotted lines in Fig. 3, the cam provided with this groove being mounted on the main shaft 1. By means of this cam the lever 15 is rocked. At the upper end of lever 15 is a link 17 connected with an arm 16 loosely pivoted on the shaft 19. On this same shaft a gear 20 is loosely mounted and fixed to the gear 20 in any suitable manner is a ratchet wheel, shown in Fig. 3. Intermediate the ends of the arm 16 there is a pawl spring pressed into engagement with the ratchet. As the lever 15 rocks, this pawl engages the ratchet wheel and rotates it and the gear 20 step by step. The gear 20 is in mesh with a small gear keyed to the shaft 21 (see Fig. 3) on which shaft the roll 25 is also keyed. Inasmuch as the roll 24 may be adjusted against the roll 25 with any desired degree of pressure and is provided with a friction face to engage the paper it will be clear that when the roll 25 is rotated, by the means already described, a desired length of wrapping strip d will be fed downwardly through the paper guides e in the desired manner.

Figure 7:
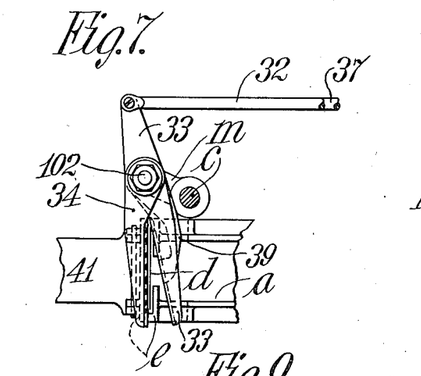
Fig. 7 is a detail view of the cutting mechanism for the wrapper strip showing in dotted lines the mechanism for clamping or holding the strip just prior to the cutting operation.

The cutting mechanism will now be described. A strip of paper is shown hanging from the rolls 24 and 25 in Fig. 4 and in this position it is desirable in the machine disclosed to cut this strip without allowing it to fall downwardly. The cutting mechanism is best shown in Figs. 4 and 7. A rocker arm 29 is pivoted on the center 28 and its lower end is provided with a roller bearing on the surface of cam 30 keyed to the shaft 2. The upper end of the arm 29 is pivoted to a horizontal link 32. The other end of this link is pivoted to the movable cutter arm 33. This cutter arm 33 is pivoted on a pin 102 mounted on the outer end of the supporting arm $m$, fastened to the supplemental frame $c$. The stationary cutter arm 34 is fixed on the pin 102. The cam 30 is timed to swing the cutter arm 33 against the cutter arm 34 and cut the paper immediately after the clamp 39, pivoted on pin 102 below the cutter arms, has forced the depending wrapper strip against the side of the guide $e$.

The manner of clamping the strip for cutting is as follows: A rocker arm 35 is pivoted on the main frame at 36 and at its lower end is provided with a roller bearing on the cam 30. Its upper end is pivoted to one end of a connecting link 37. The other end of this connecting link 37, as best shown in Fig. 3, is connected to the outer end of the pivoted clamp arm 39. This arm 39, as stated, is pivoted on the pin 102, and its form is indicated in Fig. 7. When the clamp arm 39 is moved toward the guide $e$ by the mechanism described, the depending strip $d$ is clamped against the guide. It will be seen from the drawing that inasmuch as the operating levers 29 and 35 are both forced against the same cam surface of the cam 30 by the springs 31 and 38, and since the arm 35 bears against the cam below the arm 29 that this arm 35 will be operated first. Immediately thereafter the cutting mechanism will be operated and then both will be released and the arms 39 and 33 returned to inoperative position. The mechanism is so timed that the depending strip $d$ will be cut just before the article B is pushed by the plunger face 10 into the folding box and the clamp 39 will release the strip at approximately the same time the article B is pushed against the paper and into the folding box. It is apparent that if the wrapper strip is to be properly placed with relation to the article B when the two are forced into the wrapping chute or box, the clamping and the cutting of the paper and then the releasing of the paper by the clamp must be very accurately timed. It is preferred in wrapping machines to avoid the necessity of reciprocating nippers to feed the paper. However, in many places this nipper mechanism is considered necessary because it insures a positive feed. By the arrangement of the paper feed as described the rolls 25 and 24, inasmuch as they force the paper downwardly, are in effect a positive feed, whereas, if the paper were fed horizontally through guides, the feed might not be positive at all times. The paper feed disclosed is especially adapted for wrapping machines wherein it is desired to feed a strip of paper from a roll and properly position the paper with relation to the article to be wrapped.

Figure 9:
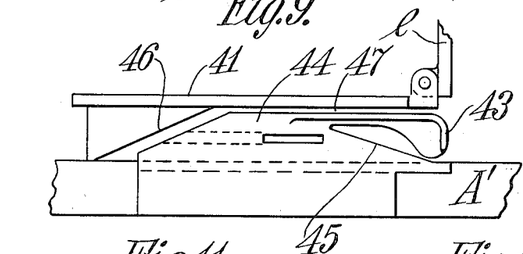
Fig. 9 is a side elevation of the folding chute or box or die.
Figure 10:
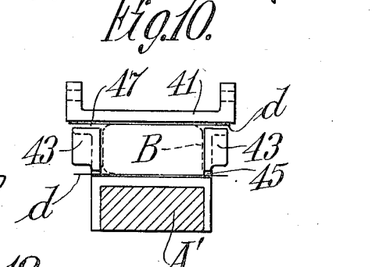
Fig. 10 is a front elevation of the folding chute showing the package in place therein.
Figures 11, 12, 13, 14:
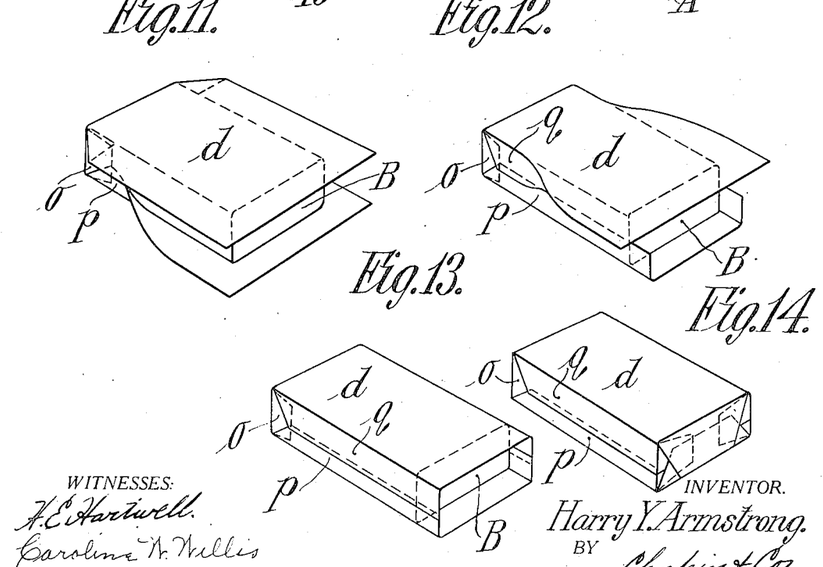
Figs. 11, 12, 13, and 14 disclose in perspective view certain steps in the wrapping operation.

The folding box or chute will now be described. Referring to Figs. 4 and 9; the chute comprises in effect four walls, the top wall 41 being hinged at the lower end of the upper guide $e$. To this top wall 41 is attached at the rear side edges thereof two depending flanges for a purpose to be described. These flanges rest against the bottom wall and support the top wall in horizontal position. The top wall is held in place by two thumb bolts 42 passing through ears on the top wall and hinged to the frame A' (see Fig. 5). Whenever it is desired to get at the interior of the folding chute the top wall may be turned upwardly leaving the interior of the chute exposed. The bottom wall of the chute is in effect the top of the frame A'. The side walls 44 are fastened to the sides of the main frame A' in any suitable manner and are each provided with oppositely inclined end portions. The front ends of these side walls 44 have flanges 43 extending forwardly therefrom. When the article B is pushed by the plunger face 10 against the depending strip of wrapping material $d$ and into the folding chute, the outwardly extending flanges 43 force the wrapping material extending beyond the side edges of the article B along and against the side edges of the article, as indicated by the fold $o$ in the Fig. 11. The bottom side extension of the wrapper $d$ as the article is pushed farther into the box is engaged at each side by an inclined edge 45 provided in the folding chute in each side wall thereof. These edges 45 cause the fold $p$ indicated in Figs. 11 and 12 to be made against each side of the article. The top side extensions of the wrapper $d$ in this operation pass undisturbed through the slots 47, between the side and top walls until it reaches the inclined edges 46 of the flanges at the rear of the top wall 41. When the extensions are pushed against the inclined edges 46 they are folded downwardly into overlapping relation with the folds $p$ and make up the folds $q$, indicated in Fig. 12. Before these folds $q$, are made, however, gum is applied in a strip to the folds $p$ by means of gum applying rolls 51 one extending through each side wall of the folding chute in a manner to be described. As the folds $q$ are brought down against and into overlapping relation with the folds $p$ the article B is entirely closed except at one end, as indicated in Fig. 13 at which end there is a tubular end extension of the wrapper $d$. The article thus wrapped is placed by the plunger 7 upon the vertical plunger 91 in position for the last end folds to be made.

Figures 5, 6:
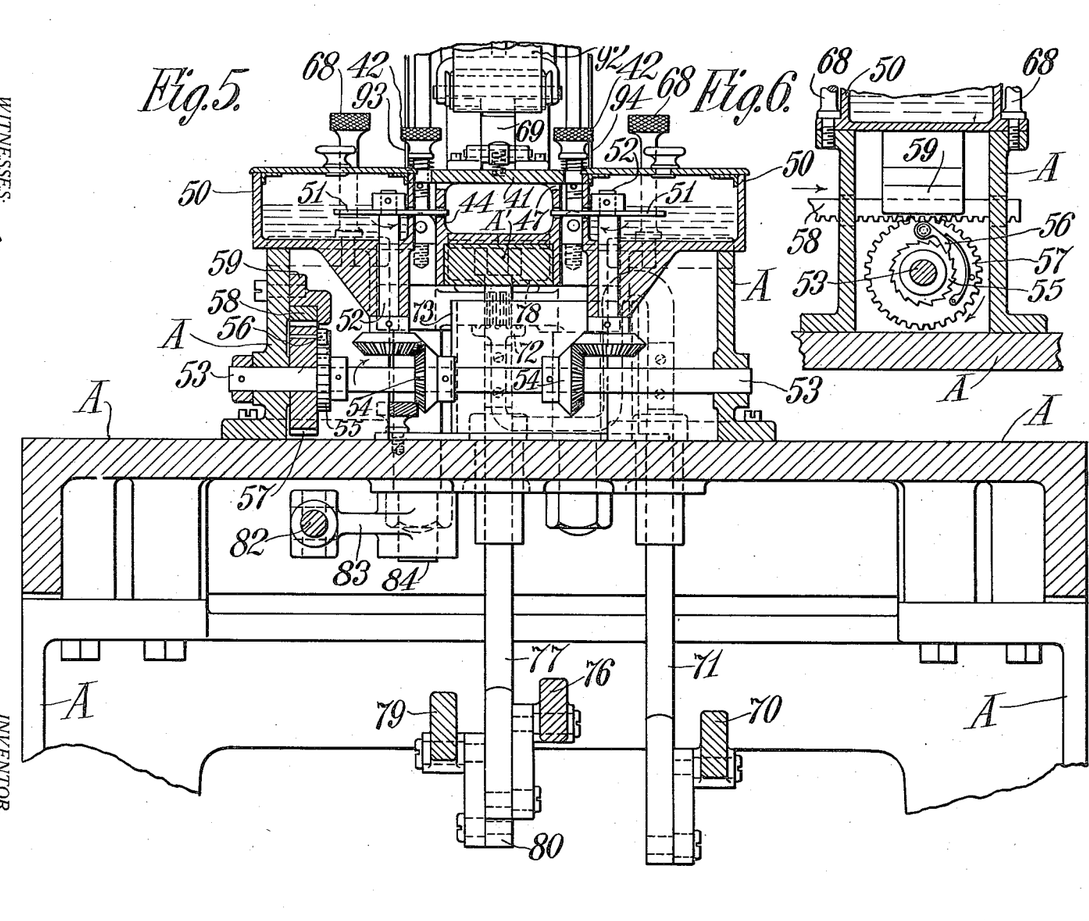
Fig. 5 is a sectional view with certain parts broken away, taken on the line 5—5, Fig. 2, looking in the direction of the arrows.
Fig. 6 is a detail sectional view of the driving mechanism for the gum applying rollers.

The gumming mechanism will now be described. Referring to Figs. 1, 2, 4, 5 and 6: At each side of the folding box or chute a gum box 50 is removably held in place by means of the thumb bolts 68 which engage flanges on the gum box 50 and pass into the main frame A. Arranged in each one of the gum boxes 50 there is a gum applying roller 51 which is mounted on one of the upstanding shafts 52 and adapted to rotate in contact with the gum in the box 50 and extend through a slot in the side wall of the folding chute 44, as best indicated in Fig. 5. These shafts 52 are provided at the lower ends thereof with bevel gears in mesh with suitable gears 54 on the horizontal shaft 53 mounted in the main frame A. On this shaft 53 there is keyed a ratchet 55. Mounted loosely on the shaft 53 adjacent to the ratchet is a gear 57 which is operated by the rack 58, the latter being held in engagement with the gear by the gib 59. On this gear 57 is mounted a pawl 56 spring pressed into engagement with the ratchet teeth.

When the plunger 7 is moved to feed the articles B through the machine it also operates to move the rack bar 58 through the connection shown in Fig. 8. This rack bar 58 is mounted to slide in suitable brackets fastened to the main frame A and embracing the rack bar 58 is a connecting arm 62 which is fastened to the underside of the plunger 7. This arm 62 slides along the rack bar 58 until it engages an adjustable collar 61 or 63. When the arm 62 engages the collar 61 fastened to the bar 58 the latter is moved horizontally and rotates the gear on shaft 53 due to the pawl 56, and through the connections already described rotates the gum applying rollers 51. The parts are so designed, as indicated in the drawings, that the rollers 51 will thus be positively driven at a peripheral speed equal to the speed at which the article B passes through the folding chute. In this manner the periphery of each of the rolls 51 which during part of its rotation is immersed in gum in the gum box 50 will roll on the folds p of the wrapper d without any sliding action therebetween and thus lay a strip of gum on each of the folds p in a uniform and even manner. If the gum applying rollers 51 were not positively driven in the manner described or in some equivalent manner the gum would not be laid evenly along the fold p for the reason that any sliding action between the periphery of the gum applying roller and the wrapping material would wipe off the gum at one particular spot on the periphery of the roller, after which no further gum would be applied to the fold as the article moves until the roller could be turned to bring a gum covered part of the periphery against the wrapper. When the plunger 7 is returned for the next stroke the arm 62 engages the adjustable collar 63 and pulls the rack bar 58 backwardly but without turning the gum applying rollers 51 for the reason that the pawl 56 rides freely over the teeth of the ratchet 55 without engaging the teeth. The slot through each gum box for the roller 51 to rotate is not of sufficient width to permit the gum to flow therethrough. This mechanism is of particular advantage where the article to be gummed is moved at a variable speed.

Figure 1:
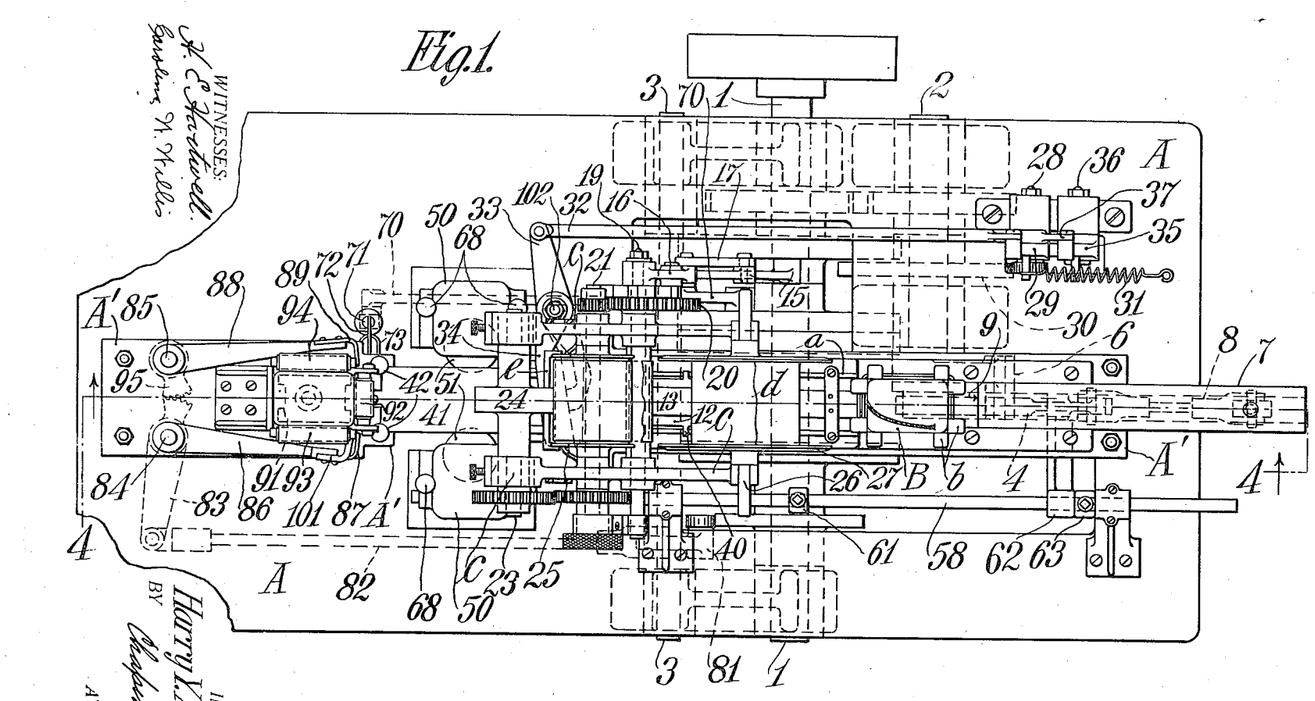
Figure 1 is a plan view of the machine with certain parts broken away.

The mechanism for closing end tubular extension of the wrapper over the end of the article will now be described. Referring to Figs. 1, 2, 3, and 4, as already stated, the plunger face 10 delivers the article B on the plunger 91 completely wrapped except for the one end, as indicated in Fig. 13. With the article in the form shown in Fig. 13 resting on the plunger 91, the end extension of the wrapper is folded in against the exposed end of the article by first folding both side extensions of the wrapper against the article then the bottom extension against the side folds and then the top end extension against the other end folds to bind the latter. The mechanism for folding in the side extensions of the wrapper is best seen in Fig. 1 and comprises two pivoted arms 86 and 88 keyed respectively to the shafts 84 and 85. These two shafts are connected to rock in opposite directions by means of the gear segments 95 meshing in a manner indicated in Fig. 1. To the shaft 84 is keyed an arm 83 and this arm is connected by the rod 82 to the upper end of a rock lever 81 (see Fig. 2). The latter is loosely pivoted on the cross rod 3 and at its lower end is provided with a roll engaging a suitable cam as indicated, keyed to the power shaft 1. A spring is provided to hold the roll in engagement with the cam in the ordinary manner. The cam mentioned is designed to rock the arm 81 at the proper time and through the connections already described to move the folding fingers 87 and 89 toward one another to force the side extensions of the wrapper d against the end of the article B (see Fig. 14). Fastened to the arm 86 is a holding member 101 which is designed when the arm 86 is moved to fold in the end side extensions to bear against the top of the article B and hold it in place for the bottom end extension to be folded against the article in a manner now to be described.

Referring to Fig 4, plate 78 is mounted on the top of the slidable arm 77 and is designed to engage the lower end extension of the wrapper and fold it against the article. This arm 77 is connected by a suitable link to the bell crank lever 76. The latter is pivoted loosely to the cross rod 3 and has its other arm provided with a roll adapted to bear against a suitable cam, as indicated, keyed to the power shaft 1. This cam rocks the lever 76 at the proper time to elevate the arm 77 and move the plate 78 upwardly for its folding operation. Just prior to the movement of the plate 78, however, it is desirable to apply spots of gum to the bottom end extension of the wrapper and this is done as follows: The gum box 73 is provided, (mounted as shown on frame A), into which a gum dabber 72 is adapted to dip. The gum dabber 72 is provided with prongs so that the gum when applied to the wrapper will only be applied thereto only in spots. The gum dabber 72 is mounted on the upper end of rod 71 suitably mounted to slide in the main frame A and extends from arm 71 horizontally and downwardly into the gum box. The lower end of this rod 71 is connected by a suitable link to one arm of a bell crank lever 70. The latter is loosely mounted on the cross rod 3 and its other arm is provided at the lower end with a roll adapted to bear against a suitable cam keyed to the power shaft 1. This cam is designed to elevate the gum dabber 72 from its position in the gum box 73 to a position for the prongs to place a line of spots of gum along the lower surface of the end extension of the wrapper, immediately after which the gum dabber 72 retires and the folding plate 78 is raised for the operation already described.

This folding plate 78 is provided with vertical slots in line with the spots of gum which have been applied to the wrapper so that as the plate 78 makes its fold it will not rub against the gum already applied. As the plate 78 is forced upwardly the holding device 101 prevents the package from tipping as it rests on the plunger 91. The side folding fingers 87 and 89 retire as the plate 78 makes its fold. While the plate 78 holds the fold just made the plunger 91 is elevated by means of the rod 80 and its connection at the bottom thereof (see Fig. 2) by means of a suitable link to the bell crank lever 79. The latter is loosely mounted on the cross rod 3 and at its lower end is provided with a roll to engage a suitable cam keyed to the power shaft 1. When the plunger 91 is elevated the top end extension of the wrapper is folded against the other end folds into overlapping relation with the bottom fold supplied with spots of gum in the manner described. The rear edge of the folding box 41 engages the top end extension to force it into folded position as the article B is pushed into the delivery chute. The article B last delivered into the delivery chute is held in place by means of the spring latch 69 pivoted on the top of the folding box 41, as best shown in Fig. 4. The plate retires and the plunger 91 is then lowered to receive the next article.

The improved delivery chute will now be described. Referring to Figs. 1, 2, 3, and 4; as the article B completely wrapped is delivered into the chute it is possible that a certain amount of gum has been squeezed between the overlapping folds and where this is the case there is likelihood of the wrapper of any one article sticking to the side walls of the chute. Where the articles are forcibly pushed through the chute the wrappers of those articles which may be stuck to the side walls of the chute would be likely to tear unless special provision is made to prevent this. The means provided for this purpose comprises at the front and two side walls, cloth belts 92, 93 and 94. Each one of these belts is independently mounted on loose rolls suitably arranged as indicated at the top and bottom of the chute. Where one of the articles has any gum squeezed out so that it is exposed the package will stick to one of the cloth belts mentioned and as the pile is pushed upwardly the belt will move with the pile so that the gum will have a chance to dry before the article leaves the top of the chute. The articles can therefore be removed from the top of the chute leaving the latter clear for the following articles.

The front and side walls of the delivery chute may be readily removed when desired as will be seen from the construction indicated in the drawings.

While my invention has been indicated in one preferred form it is clear that it may be embodied in other forms. It is therefore more truly defined by the appended claims than by the detailed description of the one form preferred. Some features of the plunger mechanism are broadly like those disclosed in my pending application, Serial No. 656,504, filed October 24, 1911, and accordingly broad claims to these features are present in my earlier application instead of in this case.

What I claim is—

1. In a wrapping machine, the combination of folding mechanism through which the article and wrapper is arranged to pass, said mechanism being constructed and arranged to form overlapping folds on the article as the latter passes therethrough, together with a gum applying mechanism comprising a roller, the periphery of which is adapted to bear against one of the underlying folds after the same has been folded against the article and means to positively drive the roller at a peripheral speed equal to the speed of the article through the mechanism, means to supply the periphery of the roll with a continuous film of gum and means to move an article through said folding mechanism.

2. In a wrapping machine, the combination of a folding mechanism, means to feed articles to be wrapped to said mechanism, comprising a reciprocating plunger provided with two plunger faces, one in advance of the other and the forward face being at a lower level than the rear face, an open ended magazine under which the plunger is adapted to reciprocate while supporting the articles in the magazine, the rear plunger face being adapted to remove the articles from the magazine one by one and move them a given distance toward the folding mechanism, and to support the article during its return movement, a pawl operative to prevent the return of an article so fed as the plunger is returned for the next operation, a positioning device arranged to move the article so fed into line with the forward plunger face whereby the latter will feed an article to said folding mechanism at each reciprocation of the plunger, and means for reciprocating said plunger.

3. In a wrapping machine, the combination of folding mechanism for folding rectangular objects, comprising a folding chute, devices for feeding articles to be wrapped and wrapping material into said chute, the top and bottom walls of said chute being arranged to fold the wrapping material over the top and bottom of the article as it is forced into the chute into a U-shaped form leaving end and top and bottom side extensions of the wrapper on the article, folding blades arranged at the forward end of the chute to fold the forward end extensions against the sides of the article, folding blades in the chute arranged to fold the bottom side wrapper extensions against the sides of the article, means to apply a film of gum to each of said folded bottom side extensions, folding blades in the chute arranged to fold the top side wrapper extensions against said gummed bottom side extensions in overlapping relation, whereby when the article passes through said chute with a wrapper it is completely inclosed with the wrapper folded thereagainst in overlapping folds except at the rear end thereof.

4. In a wrapping machine, the combination of folding mechanism arranged to pass a wrapper completely around an article in overlapping folds except for one end thereof where a tubular end extension of the wrapper is left, means for folding said tubular end extension of the wrapper against the uncovered end of the article comprising a support for the partially wrapped article, wrapping fingers arranged to move toward one another to fold the side end extensions of the wrapper against the end of the article, means for applying gum to one of the remaining extensions of the wrapper, folding mechanism for folding the gummed extension against the end of the article, means for holding the article on the support during said last mentioned folding operation, and means to move said support and said partially wrapped article against a folding blade to fold the last extension of the wrapper into overlapping relation with the gummed extension and said folding blade.

5. In a wrapping machine, the combination of folding mechanism arranged to pass a wrapper completely around an article in overlapping folds except at one end thereof where a tubular end extension of the wrapper is left, means to seal said overlapping folds together, means for folding tubular end extensions of the wrapper against the uncovered end of the article comprising a support for the partially wrapped article, wrapping fingers arranged to move toward each other to fold the side end extensions of the wrapper against the end of the article, means for applying gum to one of the remaining extensions of the wrapper, folding mechanism for folding the gummed extension against the end of the article, means for holding the article on the support during said last mentioned folding operation, means to move said support and said partially wrapped article against a folding blade to fold the last extension of the wrapper into overlapping relation with the gummed extension and said folding blade, and a device to press and retain said gummed folds against the article until the gum has set, said device comprising a vertical delivery chute through which said articles pass, said chute having the walls, against which each of the gummed folds bear, provided with movable belts adapted to travel with the article through the chute.

HARRY Y. ARMSTRONG.

Witnesses:
F. G. NEAL,
H. E. HARTWELL.